US005880184A

United States Patent [19]

Lazarus

[11] Patent Number: 5,880,184

[45] Date of Patent: Mar. 9, 1999

[54] LOW-DENSITY PACKING COMPOSITIONS

[75] Inventor: Charles Raphael Lazarus, Kitchawan, N.Y.

[73] Assignee: Environmental Packing, Bridgewater, N.J.

[21] Appl. No.: 13,946

[22] Filed: Jan. 27, 1998

[51] Int. Cl.$^6$ .............................. C08L 3/00; C08G 63/48

[52] U.S. Cl. .......................... 524/47; 524/52; 525/54.31; 525/56; 525/57; 523/124; 523/128

[58] Field of Search .................... 524/47, 52; 525/54.41, 525/56, 57; 523/124, 128

[56] References Cited

U.S. PATENT DOCUMENTS

| | | | |
|---|---|---|---|
| 4,394,479 | 7/1983 | Serlin | 524/459 |
| 4,675,830 | 6/1987 | Nagasawa et al. | 524/236 |
| 5,413,855 | 5/1995 | Karl-Heintz Kolaska et al. | 428/320.2 |

*Primary Examiner*—Nathan M. Nutter
*Attorney, Agent, or Firm*—Don O. Winslow; Ellen T. Dec

[57] ABSTRACT

A biodegradable composition suitable for the manufacture of low density loose-fill packing by extrusion, which is an aqueous dispersion comprising (1) finely divided particles of a gelatinizable starch product and (2) a water-soluble polymer dispersed in (3) water having dissolved therein (4) a copolymer of vinyl, methyl, ether and maleic anhydride.

10 Claims, No Drawings

LOW-DENSITY PACKING COMPOSITIONS

FIELD OF THE INVENTION

The invention relates to low-density packing compositions. In particular, the invention relates to such compositions which are biodegradable.

BACKGROUND OF THE INVENTION

Expanded packing products, which are hardened polymer foams, enjoy widespread use as loose-fill packing material. Loose fill packing based on polystyrene currently constitutes the majority of the market for such expanded foam packing products. The use of polystyrene for this purpose has enjoyed several advantages: (1) such foams are relatively inexpensive; (2) very low density foams can be made therefrom; (3) the foams are quite uniform in their physical properties; (4) they have good resiliency; (5) they have a pleasing appearance; and (6) they are easily conveyed in air. Thus, while the advantages of polystyrene packing are many, the disadvantages of the material are significant: (1) the manufacture of polystyrene foams involves volatile hydrocarbon blowing agents, such as pentane, which presents a fire hazard, or halocarbons, which are environmentally unacceptable; and (2) such foams are not biodegradable.

More recently, substantial progress has been made toward the use of starch-based foamed packing, which has the distinct advantage of being biodegradable both in sunlight and in the difficult conditions that exist in compost heaps, landfills and other common disposal means. Such starch-based packing is customarily based on formulations of a water-soluble polymer, such as poly(vinyl alcohol), with various kinds of starch. Though starch-based packing has many physical properties comparable to polystyrene-based packing materials, it has heretofore been quite difficult to obtain comparably low densities at economical material costs. Low densities are, of course, quite important from three different viewpoints: (1) minimization of the weight of packaged goods; and (2) ease of conveying the foamed packing from storage to the packing site, and (3) lower per unit volume cost of packing materials. In particular, the flow characteristics of starch-based packing have been found to be a function of the density of the packing particles. Thus, low density particles are much easier to handle in pneumatic conveying devices than higher density particles.

As a result of these differences in properties, there is considerable incentive to create starch-based packing materials having lower densities than those previously obtained, but which are nevertheless comparable to those obtainable with polystyrene packing.

SUMMARY OF THE INVENTION

In a first aspect, the invention is directed to a biodegradable composition suitable for the manufacture of low density loose fill packing by extrusion, comprising (1) finely divided particles of gelatinizable starch product, (2) a water-soluble polymer, in which the weight ratio of starch to water-soluble polymer is 5–20, dispersed in (3) water, which constitutes 5–10% by weight of the dispersion, the dispersion having dissolved therein (4) 0.05–5.0% by weight of the dispersion of a copolymer of vinyl methyl ether and maleic anhydride.

In a second aspect, the invention is directed to a method for preparing nuggets of loose fill packing comprising (1) extruding the above-described composition through the die of an extruder at conditions of temperature and pressure such that the temperature of the composition during extrusion exceeds 212 F., but is below the thermal decomposition temperature of any component thereof and (2) cutting the extrudate to form nuggets of preselected length.

DETAILED DESCRIPTION OF THE INVENTION

Starch Component

The starch/polymer composition which can be used in the invention can utilize starch derived from any source so long as it is gelatinizable by the application of heat and pressure. Accordingly, the starch can be derived from purified, industrial grade starch or from unpurified, natural starch or even from starch fractions. Thus, unmodified and modified potato, wheat, tapioca, rice, corn, milo, millet, sago starches and mixtures thereof may be used. In addition, genetically modified starches in which the ratio of branched and unbranched chains has been altered can also be used so long as they are gelatinizable under the temperature and pressure conditions characteristic of extruder operation. In this regard, high amylose corn, which is comprised of straight chain starch molecules, would not be preferred because it is difficult to gelatinize even in boiling water. Potato starch is preferred.

Water-Soluble Polymer Component

A wide variety of polymers, including copolymers, may be used in conjunction with the above-described starch composition so long as they are biodegradable. Water-soluble polymers, such as poly(vinyl alcohol) are preferred. However, mixtures of water-dispersible polymers with minor amounts of water-insoluble polymers can be used. Such polymers are disclosed in U.S. Pat. No. 5,095,054 to Lay et al. and include the following classes:

(1) Multifunctional polymers at least one functional group of which is hydroxyl;

(2) Multifunctional polymers at least one functional group of which is carboxyl;

(3) Polymers containing tertiary or quaternary amino groups or salts thereof;

(4) Modified polysaccharides containing carboxyl, hydroxyalkyl, alkyl ether or ester groups with organic acids;

(5) Copolymers of vinylpyrrolidone;

(6) Cationically modified polysaccharides;

(7) Anionically modified polysaccharides;

(8) Copolymers of vinyl esters and non-functional monomers in which the ester group is hydrolyzed;

(9) Polysaccharide graft copolymers;

(10) Poly(alkylenimines) and copolymers thereof;

(11) Styrene sulfonic acid polymers and copolymers; and

(12) Carboxylic polymer and copolymer salts.

Because of its low price and superior physical properties, the preferred water-soluble polymer for use in the invention is poly(vinyl alcohol). So long as the poly(vinyl alcohol) [PVA] is water soluble, as defined hereinbelow, the degree of hydrolysis of the polymer is not a critical variable. Most available grades of PVA are, however, at least 88% hydrolyzed and frequently are at least 93% hydrolyzed. For use in the invention, it is preferred that the polymer be supplied in granular form so that it can be easily mixed with the starch. It is preferred that the weight ratio of starch to water-soluble polymer be in the range of 5–20 and preferably 8–12.

As used herein, the term "water soluble" refers to solubility of the polymer in unheated water such as tap water or water at ambient or room temperature at concentrations up to a level which is limited by viscosity.

Copolymeric Density Modifier

The primary density modifying substance in the compositions of the invention is a copolymer of vinyl methyl ether and maleic anhydride, preferably having a number average molecular weight of 10,000–50,000. In the development of the invention, it was found quite unexpectedly that various homologs and analogs of the above-described copolymer were much less effective or not effective at all. However, it has also been found that the effectiveness of the density modifying substance is directly related to its molecular weight. Thus, a lesser amount of density-modifying copolymer is needed when higher molecular weight copolymers are used to reduce the density of a given composition. It is further preferred, however, that the molecular weight of the copolymer be in the range of 15,000–30,000. It should also be noted that either the free acid, anhydride or salt form of the copolymer can be used in the practice of the invention.

Other Components

The biodegradable starch-polymer mixtures for use in the invention can and will usually contain small amounts of additives such as lubricating agents, nucleating agents and the like. Talc, fumed silica, silica and the like can be used as nucleating agents for the invention. Suitable lubricating agents include such materials as poly(ethylene glycol) [PEG], hydrogenated and nonhydrogenated vegetable oils, saturated and unsaturated fatty acids, soaps and greases. Such additives will not usually be used at a total level more than about 5%, by weight, basis combined weight of the starch and polymer.

Loose-fill Packing Manufacture

The loose-fill packing for use in the invention is preferably made from an admixture of biodegradable starch and water-dispersible (preferably water-soluble) biodegradable polymer in the following manner:

The ingredients are easily mixed using a low-shear mixing device such as a ribbon or paddle mixer. It is preferred that the dry components be blended first, after which, water is added. The amount of water added relative to the weight of dry components will be varied according to the desired density of the particles. The amount of water contained in the extruded composition should be about 5–10% wt., basis weight of the dispersion, 6–8% wt. being preferred. Therefore, the water added to the composition before extrusion must be sufficient to provide these amounts of water in the extruded product.

The above-described mixture of ingredients is processed into loose-fill packing by extrusion using conventional single or twin-screw extruders which can have one or more die heads. For the purposes of the invention, it is preferred that the extruder be operated at a die pressure of 500–3000 psi, a die temperature of more than 230 F. and residence time of no more than one (1) minute, and preferably less than thirty (30) seconds. A die temperature of at least 250 F. is preferred.

It is recognized that, as the extrudable composition is compressed within the extruder, its temperature may exceed the die temperature. However, so long as the residence time within the extruder is less than one (1) minute, there will be little thermal degradation of the composition and the foamed product.

In a preferred method of carrying out the extrusion operation, the water content of the extruded loose-fill packing is measured and the water content of the admixture entering the extruder is adjusted in accordance with the bulk density of the extruded product. It has been found that the amount of water fed to the extruder will usually be about 20–25% by weight of the total dispersion. In many operations, it is desired that the bulk density of the extruded product be as low as possible and a suitable bulk density is specified for commercial scale production. If the bulk density is below the pre-selected value, the amount of water in the feed to the extruder is increased to raise the density of the extruded product or decreased to reduce the density of the extruded product.

It is preferred that the residence time of the admixture within the extruder not exceed about one (1) minute and that the maximum temperature attained by the feed within the extruder not exceed about 425 F., lest some of the raw materials become excessively degraded by thermal decomposition. It will be observed that the maximum temperature within the extruder will normally be higher than the temperature at the die head and in some instances it may be desired to cool the jacket of the extruder. It is further preferred that the residence time within the extruder not exceed thirty seconds. It will be clear to those skilled in the art that the starch contained in the extruder feed undergoes gelatinization, but it is not necessary that the starch be destructurized to the extent taught in the Lay et al. patent. Nevertheless, such destructurized starch/polymer mixtures may be used in the invention.

For most economical operation, the discharge from the extruder can be made directly to room ambient conditions. Special cooling is not required to obtain rapid solidification at room temperature.

It is preferred in the practice of the invention that the loose-fill particles have no dimension smaller than about 10 mm and preferably at least 30 mm. On the other hand, it is preferred that the maximum dimension of the particles be no larger than about 50 mm. Particles which are roughly cylindrical in shape having a diameter of about 15 mm and a length of about 30–40 mm are preferred because they have superior densification and packing characteristics. Cylindrical shapes are, of course, conveniently produced in the formation of foamed particles by extrusion. Though cylindrical shapes have been found to be advantageous, irregular shapes and other regular shapes can also be used, such as spheres and ellipsoids.

EXAMPLES

Examples 1–7

A series of seven tests was conducted to illustrate the invention and to compare it with compositions which did not contain the copolymer density agent. Each of these tests was carried out with batches of about 50 pounds of the mixture of starch and water-soluble polymer. The water-soluble polymer in each test was poly(vinyl alcohol), (1) the density-modifying copolymer was a copolymer of vinyl methyl ether and maleic anhydride, (2) and the amount of water added to the extrusion mixtures was sufficient to provide 6.5–8.0% by weight water in the extruded product. In each of the tests, talc was used as a nucleating agent and soya triglyceride was used as a processing lubricant. The data from these tests are given in Table 1 below:

TABLE 1

| Example Number | 1 | 2 | 3 | 4 | 5 | 6 | 7 |
|---|---|---|---|---|---|---|---|
| Components | | | | (lbs) | | | |
| Potato Starch | — | — | — | — | — | 37.0 | 74.7 |
| Wheat Starch | 47.1 | 46.7 | 40.2 | 40.2 | 41.5 | 4.4 | — |
| PVA(1) | 2.5 | 2.5 | 9.0 | 9.0 | 7.5 | 7.5 | 12.5 |
| Copolymer(2) | — | 0.25 | — | 0.12 | 0.05 | 0.05 | 0.1 |

TABLE 1-continued

| Example Number | 1 | 2 | 3 | 4 | 5 | 6 | 7 |
|---|---|---|---|---|---|---|---|
| Talc | 0.2 | 0.2 | 0.25 | 0.25 | 0.25 | 0.18 | 0.35 |
| Soya triglyceride[(3)] | 0.15 | 0.15 | 0.05 | 0.05 | 0.05 | 0.05 | 0.1 |
| Poly(ethylene glycol) | — | — | 0.5 | 0.5 | 0.5 | — | 1.0 |
| Glycerin | — | 0.2 | — | — | — | — | — |
| Operating Conditions | | | | | | | |
| Extruder RPM | 558 | 558 | 526 | 526 | 509 | 525 | — |
| Die Temperature (F.) | 265 | 237 | 271 | 279 | 307 | 268 | 300 |
| Pressure (psi) | 1786 | 1504 | 2736 | 2032 | 1702 | 2256 | — |
| Density (lbs./ft.$^3$) | 0.89 | 0.73 | 0.77 | 0.60 | 0.63 | 0.52 | 0.46 |

[(1)]P-17, Oriental Chemical Industries, Seoul, Korea
[(2)]Gantrez S-97 BF, ISP Technologies, Wayne, NJ
[(3)]Product 399, Whittaker, Clark and Daniels, Plainfield, NJ A comparison of the data from Example 1 with the data from Example 2 shows a clear reduction in density of the extrudate equivalent to about 18% resulting from the addition of only about 0.5% by weight of the above-described copolymer to the starch/PVA composition being extruded. These data are supplemented by the data from Examples 3 and 4 which show a reduction in density of the extrudate equivalent to about 22% merely by the inclusion of only about 0.25% by weight of the copolymer to the composition being extruded. Examples 5–7 show that the use of even smaller concentrations of the density modifying copolymer can be effective to give loose fill densities as low as 0.46 lbs/ft$^3$.

Examples 8–11

A further series of four compositions was prepared to observe the density-reducing effectiveness of the above-described copolymer to reduce density of the extruded loose fill composition. These tests were made in production size batches of 1,000 pounds each. The data from this series of tests are given in Table 2 below:

TABLE 2

| Example No. | 8 | 9 | 10 | 11 |
|---|---|---|---|---|
| Components | | | | |
| Potato Starch | 74.7 | 74.7 | — | — |
| Wheat Starch | 8.8 | 8.8 | 83.5 | 83.5 |
| Maltodextrin | 3.5 | 3.5 | 3.5 | 3.5 |
| PVA | 12.5 | 12.5 | 12.5 | 12.5 |
| Copolymer | — | 0.1 | — | 0.1 |
| Talc | 0.35 | 0.35 | 0.35 | 0.35 |
| Soya Triglyceride | 0.1 | 0.1 | 0.1 | 0.1 |
| Operating Conditions | | | | |
| Extruder Exit Temp (F.) | 320–330 F. | | | |
| Extruder Pressure (PSI) | 1200–2000 | | | |
| Product Properties | | | | |
| Density (lbs/ft$^3$) | 0.54 | 0.45 | 0.52 | 0.48 |
| Density Reduction % | — | 17 | — | 8 |

The foregoing data show that the use of a major amount of potato starch in the composition (Examples 8 and 9) yielded a density reduction of about 17% using only 0.1% by weight of the copolymer density reducing agent. On the other hand, when the potato starch was replaced by wheat starch, the reduction in density was only about 8%. From this, it can be seen that potato starch is a more effective starch than wheat starch for use in the invention.

We claim:

1. A biodegradable composition suitable for the manufacture of low density loose fill packing by extrusion comprising (1) finely divided particles of gelatinizable starch product, (2) a water-soluble polymer in which the weight ratio of starch to water-soluble polymer is 5–20, dispersed in (3) water, which constitutes 5–10% by weight of the dispersion, the dispersion having dissolved therein (4) 0.05–5.0%, basis weight of the dispersion, of a copolymer of vinyl methyl ether and maleic anhydride, in either its salt, anhydride or acid form.

2. The composition of claim 1 in which the gelatinizable starch product is selected from the flour and modified and unmodified starches of potato, wheat, sorghum, tapioca, rice, corn, milo, millet, sago and mixtures thereof.

3. The composition of claim 2 in which a major amount of the starch component is potato starch.

4. The composition of claim 3 in which the starch component is an admixture of 50–90% wt. potato starch and 50–10% sorghum flour.

5. The composition of claim 2 in which the starch component is comprised of 5–20% by weight of high amylose starch.

6. The composition of claim 1 in which is dispersed 0.1–1.0% wt., basis weight of the dispersion, of finely divided particles of a nucleating agent.

7. The composition of claim 2 in which the nucleating agent is talc.

8. A method for preparing nuggets of loose fill packing comprising (1) extruding the composition of claim 1 through the die of an extruder at conditions of temperature and pressure such that the temperature of the composition during extrusion exceeds 212° F., but is below the thermal decomposition temperature of any component thereof and (2) cutting the extrudate to form nuggets of preselected length.

9. The composition of claim 1 in which the water-soluble polymer is poly(vinyl alcohol).

10. The composition of claim 1 in which the copolymer (4) has a number average molecular weight of 10,000–50,000.

* * * * *